United States Patent
Kolblin et al.

(10) Patent No.: US 8,830,051 B2
(45) Date of Patent: Sep. 9, 2014

(54) METHOD FOR DYNAMICALLY ADAPTING A DIAGNOSTIC SYSTEM

(75) Inventors: Robert Kolblin, Lorrach (DE); Emilio Schiavi, Oberwil (CH); Michael Maneval, Schopfheim (DE); Jorg Hahniche, Magdeburg (DE)

(73) Assignee: Endress + Hauser Process Solutions AG, Reinach (CH)

( * ) Notice: Subject to any disclaimer, the term of this patent is extended or adjusted under 35 U.S.C. 154(b) by 475 days.

(21) Appl. No.: 13/125,630

(22) PCT Filed: Oct. 9, 2009

(86) PCT No.: PCT/EP2009/063179
§ 371 (c)(1),
(2), (4) Date: Apr. 22, 2011

(87) PCT Pub. No.: WO2010/046248
PCT Pub. Date: Apr. 29, 2010

(65) Prior Publication Data
US 2011/0215924 A1    Sep. 8, 2011

(30) Foreign Application Priority Data
Oct. 22, 2008 (DE) .................. 10 2008 043 094

(51) Int. Cl.
G08B 29/00 (2006.01)
G05B 19/042 (2006.01)

(52) U.S. Cl.
CPC .. G05B 19/0428 (2013.01); *G05B 2219/24033* (2013.01); *G05B 2219/31439* (2013.01); *G05B 2219/24065* (2013.01); *G05B 2219/31438* (2013.01)
USPC ............. 340/506; 340/531; 340/540; 700/80

(58) Field of Classification Search
USPC ............ 340/506, 514, 521, 531, 533, 539.22, 340/539.26, 540, 679, 584, 606, 612, 626; 700/9, 12–18, 28, 32, 78–80, 83
See application file for complete search history.

(56) References Cited

U.S. PATENT DOCUMENTS 5,768,119 A    6/1998  Havekost
7,504,961 B2 *  3/2009  Flanders ................. 340/679
(Continued)

FOREIGN PATENT DOCUMENTS

DE          195 00 452 A1    7/1996
DE     10 2005 040 822 A1    3/2007
(Continued)

*Primary Examiner* — Thomas Mullen
(74) *Attorney, Agent, or Firm* — Bacon & Thomas, PLLC (57) ABSTRACT

A method has been invented for dynamically adapting a diagnostic system, which is at least partially implemented in a controller, and which has at least one diagnostic block. In such case, the controller is, in communication via a fieldbus with at least one field device, wherein the at least one diagnostic block is embodied in such a manner, that through this, various diagnostic parameters of the at least one field device are capable of being read. Additionally, the at least one diagnostic block is implemented (or provided) in the controller and/or in the at least one field device. The method includes steps as follows: Reading at least one diagnostic parameter of the field device by the diagnostic system; checking by the diagnostic system, referencing the at least one read diagnostic parameter, of whether a predetermined criterion for an alarm or error report is fulfilled; if such a predetermined criterion is fulfilled, automated checking by the diagnostic system, on the basis of predetermined rules, of whether an adapting of the criterion is possible in such a manner that the adapted criterion for an alarm or error report is no longer fulfilled; and outputting an alarm or error report only if such an adapting of the criterion is not possible.

15 Claims, 2 Drawing Sheets

(56) References Cited

U.S. PATENT DOCUMENTS 7,876,211 B2 * 1/2011 Granatelli et al. ............ 340/506
2008/0255681 A1 * 10/2008 Scott et al. ...................... 700/12

FOREIGN PATENT DOCUMENTS

| DE | 10 2005 063 055 A1 | 7/2007 |
| WO | WO 2007/147375 A1 | 12/2007 |

* cited by examiner

METHOD FOR DYNAMICALLY ADAPTING A DIAGNOSTIC SYSTEM

TECHNICAL FIELD

The present invention relates to a method for dynamically adapting a diagnostic system.

BACKGROUND DISCUSSION

In process automation technology, field devices are often applied which serve for registering and/or influencing properties of a process. Serving for registering are sensors, such as, for example, fill level measuring devices, flow measuring devices, pressure- and temperature measuring devices, pH-redox potential measuring devices, conductivity measuring devices, etc., which register fill level, flow, pressure, temperature, pH value, or conductivity. Serving for influencing a process are actuators, such as, for example, valves or pumps, via which can be changed the flow of a liquid in a pipeline section or the fill level in a container. In principle, all devices which are applied near to the process and deliver or work with process-relevant information are referred to as field devices. A large number of such field devices are produced and sold by the firm Endress+Hauser.

In modern industrial plants, field devices are, as a rule, connected via fieldbus systems (e.g. Profibus®, Foundation® Fieldbus, HART®, etc.) (level 1) with one or more controllers, such as, for example, a PLC (programmable logic controller), a linking device or a gateway. The controller can, in such case, execute a control application for the connected field devices. For this, measured values, for example, registered by individual field devices, are transmitted via the fieldbus system of level 1 to the controller, and the controller outputs control commands to field devices as a function of these measured values. Additionally, in modern industrial plants, one or more superordinated units, especially OPC client(s) (OPC: OLE for Process Control), which serve as a visualizing system, monitoring system, archiving system, etc., are frequently connected via a superordinated network system (level 2), such as, for example, an HSE network system (HSE: High Speed Ethernet), and a linking device or a gateway with the fieldbus system of level 1. Such a superordinated unit can, in such case, be embodied for example as a SCADA system (SCADA: Supervisory Control and Data Acquisition). The linking device or gateway can simultaneously also execute control applications with regard to field devices of the fieldbus system of level 1.

In modern field devices, as a rule, different properties of the field device itself, properties of a process in which the field device is applied, and/or properties of a communication connection of the field device are monitored. Corresponding parameters, via which information concerning these properties is given, are provided in the field devices. Such parameters are especially provided in a field device which is designed according to the Foundation® Fieldbus bus system. These parameters can, in principle, be utilized for diagnosis of the field device and its environment. In the following, these parameters, which are provided in a field device, and through which information concerning one or more of the above set forth properties are given, and which accordingly are usable for diagnostic purposes, are referred to as diagnostic parameters. A group of such diagnostic parameters is formed by diagnostic parameters, which deliver information relative to the communication connection of the field device. Another group of such diagnostic parameters is formed by device-related diagnostic parameters, which deliver information concerning properties of the field device itself and/or concerning properties of a process, in which the field device is applied.

Up to the present, there have only been limited options for reading and effectively utilizing these diagnostic parameters from a field device for a diagnosis. An opportunity exists to read such diagnostic parameters from the field device via an operating tool. A user, who reads the particular diagnostic parameters via the operating tool must then decide, based on the particular values of these diagnostic parameters, whether a critical state is present, and whether a reengineering or other measures are required. For such purpose, the user must, however, have available a relatively comprehensive technical knowledge.

Further, some diagnostic modules are in electrical current supply units for a fieldbus system, while other diagnostic modules are not in electrical circuit supply units, through which the signal transferred via the respective communication connections is metrologically registered and analyzed. In this way, information concerning properties of the communication connections of the participants connected to the fieldbus system is gained. If diagnostic parameters which deliver information concerning the communication connection of a field device are outside of an allowable region or some other criterion for an alarm or error report is given, an alarm or error report is output via the diagnostic module.

There are additionally provided, internally in field devices, limit values for the particular diagnostic parameters of the diagnostic modules. If such a limit value is exceeded, the field device and/or a controller in communication connection with the field device then outputs/output an alarm or error report. Depending on which type of diagnostic parameter whose limit value is exceeded is involved, in given cases, the status of the measured value, which is output by the relevant field device, is set to "bad". This means that the measured value is not usable. A user is then, as a rule, given an alarm or error report via a superordinated unit connected to the network system of level 2, for example via a visualizing system and/or a SCADA system.

In situations, in which an alarm or error report is given to the user (for example, via a superordinated unit connected to the network system of level 2 and/or via the diagnostic module mentioned above), a continued operation the plant is in part possible. Especially in the case of certain diagnostic parameters, the exceeding of a limit value can be uncritical for the operation of the plant as a whole, and/or the exceeding of a limit value can be caused by aging phenomena of the respective field device, field device component or of the respective communication connection, wherein a further operation of the plant is nevertheless possible. In other cases, in turn, the exceeding of a limit value of a diagnostic parameter is critical in such a manner, that the operation of the plant must actually be stopped. An operator (a service technician), who monitors such a superordinated unit and/or a diagnostic module (for the communication connection) on-site, does not, as a rule, have available sufficient technical knowledge to judge correctly the particular relevance of the occuring alarm or error reports. Accordingly, in the case of the occurrence of an alarm or error report, an operator is often compelled to stop the operation of the plant, even when the displayed alarm or error report is, in the specific situation, uncritical for the operation of the plant. Such down times of the plant lead to increased costs for the plant operator.

In DE 2005 063 055 A1, a method is described, in the case of which, in a field device, the development in time of a quality parameter for the communication connection of this field device—especially of a stale count parameter of this field device—is registered and evaluated. As a function of this development, in given cases, a limit value for the quality parameter is adapted in the field device. For registering and evaluating the time development, and, in given cases, for adapting the limit value, an expert system implemented in the field device can be applied. Via the method described in the DE 10 2005 063 055 A1, a comprehensive use of the diagnostic parameter provided by a field device is not possible. Additionally, this method does not enable various diagnostic parameters of the relevant field device and, in given cases, also various field devices, to be placed in relationship to one another, and further diagnostic information to be obtained therefrom.

On the basis of these considerations, an object of the present invention is to utilize the diagnostic parameters provided in a field device effectively for diagnosis, and to provide a user with diagnostic information in such a manner, that plant down times which are not absolutely required are prevented.

SUMMARY OF THE INVENTION

The object is achieved by a method for dynamically adapting a diagnostic system which is at least partially implemented (or provided) in a controller, and which has at least one diagnostic block. In such case, the controller is, via a fieldbus, in communication connection with at least one field device, wherein the at least one diagnostic block is embodied in such a manner, that, through this, different diagnostic parameters of the at least one field device are capable of being read. Additionally, the at least one diagnostic block is implemented (or provided) in the controller and/or in the at least one field device. The method includes steps as follows:
A) Reading at least one diagnostic parameter of the field device by the diagnostic system;
B) checking by the diagnostic system, referencing the at least one read diagnostic parameter, of whether a predetermined criterion for an alarm or error report is fulfilled;
C) if such a predetermined criterion is fulfilled, automated checking by the diagnostic system on the basis of predetermined rules of whether an adapting of the criterion is possible in such a manner that the adapted criterion for an alarm or error report is no longer fulfilled; and
D) outputting an alarm or error report only if such an adapting of the criterion is not possible.

Through the provision of a diagnostic block, via which different diagnostic parameters of the at least one field device are capable of being read, an effective use of the diagnostic parameters provided in a field device for a diagnosis is enabled. The step of reading the at least one diagnostic parameter of the field device (step A)) is, in such case, performed by at least one diagnostic block. The diagnostic system can thereby access diagnostic parameters—and, in given cases, place these in relationship to one another—which were previously only provided internally in the field device and not utilized for a diagnosis. The diagnostic system at least partially provided in the controller has, in such case, the opportunity, not only to create a diagnosis on the basis of the value of an individual diagnostic parameter, but also, during the creation of the diagnosis, especially during the step of checking whether a predetermined criterion for an alarm or error report is fulfilled (step B)), and during the step of checking whether an adapting of the criterion for an alarm or error report is possible (step C)), to place a number of diagnostic parameters of one or more field devices in relationship to one another. Preferably, it is provided that the additional steps (steps B) through D)) are, in each case, also performed via a diagnostic block.

Additionally, according to the present invention, stored in the diagnostic system, especially in the controller, are predetermined rules (or algorithms), which, in the case of one or more criteria for an alarm or error report, indicate whether, and, in given cases, in which situations (or under which conditions), an adapting of the respective criterion is possible. By the steps of checking whether an adapting of the criterion is possible (step C)), and outputting an alarm or error report only if such an adapting is not possible (step D)), is it prevented that, in situations in which a criterion for an alarm or error report is indeed fundamentally fulfilled, however, the particular situation is not critical for the operation of the plant, an alarm or error report is output and/or the status of a value, especially of a measured value, is set to "bad". In this way, an operator is not compelled to stop the operation of the plant in cases in which this is not required. The particular situation can especially be reacted to in a more specific and flexible manner. For example, as is explained below in greater detail in reference to an advantageous further development, a report can be output, which points out to an operator, that a need for maintenance indeed exists, or that a limit value was indeed exceeded, etc., but that the situation in question is, however, not critical for the further operation of the plant. The particular maintenance can thereby occur, for example, during the next (planned) shutdown of the plant.

In the creation of the predetermined rules, among other things, properties of the particular field devices can be taken into consideration. For example, it can be provided that, in the case of the occurrence of an overload situation for a sensor, a continued operation—in given cases, limited in time—of the particular field device is, nevertheless, possible. Additionally, process-specific and/or plant-specific properties can be taken into consideration. For example, in such case, it can be taken into consideration that a malfunction of certain field devices is not critical for the process of the plant, and/or that, at some process points, even a reduced accuracy of measurement is sufficient. Steps A) though D) are performed automatedly by the diagnostic system, i.e. without human intervention. Via the diagnostic system, it is accordingly effectively prevented that an operator of the plant is confronted with unnecessary alarm or error reports.

The term "diagnostic block" means here a block within the particular device software which is programmed in such a manner, that, when it is invoked, it is executed according to predetermined rules. According to the present invention, the predetermined rules (or algorithms) are, in such case, selected in such a manner, that, via at least one of the diagnostic blocks (in case a number of diagnostic blocks are provided), different diagnostic parameters of the at least one field device are capable of being read. Along with that, the particular diagnostic block can be programmed in such a manner, that it furthermore also performs one or more additional functions, which are provided with regard to the diagnostic system.

The diagnostic system can, according to the present invention, be implemented exclusively in the controller, or it can be embodied as a distributed diagnostic system, which is implemented partially in the controller and partially in one or more field devices. These variants are explored below with reference to further developments of the invention. The term "controller" means here a unit, which, via the fieldbus (level 1), is in communication with the at least one field device, and which, simultaneously, via a superordinated network system (e.g. level 2 or, generally, a backbone), such as, for example, an HSE network system (HSE: High Speed Ethernet), is in communication with one or more superordinated units (for example, a visualizing system, a SCADA system and/or an archiving system, etc.). A "controller" includes, in such case, especially a PLC (programmable logic controller), a linking device and a gateway. The term "field device" includes here, in addition to sensors and actuators, also other devices, which are connected to the fieldbus (level 1) and, via the fieldbus, are in communication with the controller, such devices including, for example, gateways and/or devices linking to additional fieldbus segments.

In an advantageous further development, in the case in which the step of checking yields the result that such an adapting of the criterion is possible, the criterion is automatedly correspondingly adapted. In this way, in situations, in which a safe operation of the plant is not endangered, the occurrence of an alarm or error report is effectively prevented. An adapting of the criterion can occur, for example, by increasing a limit value of one or more diagnostic parameters by a predetermined amount, by waiting for a predetermined time and again checking the particular criterion, by permitting a continued operation for a predetermined, limited time period before an alarm or error report is output, etc.

In an advantageous further development, the steps of checking whether an adapting of the criterion is possible (step C)), and of the output of an alarm or error report (step D)) are performed by the controller. As a rule, sufficient processor power and memory capacity for a fast and effective performing of these steps is present in a controller. Additionally, it is thereby easily enabled, that in step C), a number of diagnostic parameters of one or more field devices are placed in relationship to one another. Preferably, steps C) and/or D) are performed by a diagnostic block provided in the controller. In this way, good interoperability is assured and a calling-up and executing of the diagnostic block as well as the integrating of the diagnostic system into a superordinated control are especially facilitated.

In an advantageous further development, in the case in which the criterion is adapted, a corresponding report is output by the controller. This report can, for example, be in the form of a warning report, which reports to an operator, that a degrading of a field device, a communication connection, etc, has indeed occurred, but that a further operation is, however, still possible. While alarm or error reports are, as a rule, dispatched with high priority, such a report can, as a rule, be dispatched with lower priority. In addition to or as an alternative to a warning report, it can be provided that the status of a relevant value, especially of a measured value, is not set to "bad", but instead only to "uncertain", and, in this way, a degrading is still reported to an operator. The value in question can, in such case, still be used. In such case, it can especially be provided that the reports in each case contain status information based on status classification according to the NAMUR NE 107 classification (compare FF-912-DPS3.01 for the Foundation® Fieldbus bus system). This advantageously enables that the status information is usable and uniform, independent of the manufacturer.

In an advantageous further development, a report that the criterion was adapted, and/or an alarm or error report is given by the controller to at least one superordinated unit, especially to a SCADA system (SCADA: Supervisory Control and Data Acquisition), an asset management system and/or a visualizing system. This communication with at least one superordinated unit occurs especially via a network system of level 2, such as, for example, via an HSE network.

In an advantageous further development, a diagnostic block is provided in the field device. The provision of a diagnostic block in the field device has the advantage that an accessing of device-internal diagnostic parameters is also enabled thereby, i.e. a direct accessing which is not possible from the controller. In the case of this further development, during the step of reading, the at least one diagnostic parameter of the field device is provided via this diagnostic block. In such case, it can, for one, be provided that the particular diagnostic parameter(s) are transmitted directly to the controller, and steps B) through D) are performed in the controller. This is especially advantageous, if the predetermined criteria for an alarm or error report are stored in the controller; if, during step B), a number of diagnostic parameters of different field devices are to be placed in relationship to one another; and/or if, for performing step B), a high processor power is required.

Alternatively, according to an advantageous further development, it is provided that step B) is performed by the diagnostic block in the field device and the subsequent steps C) and D) are performed in the controller. This further development is especially advantageous for such diagnostic parameters in the case of which, for the performing step B), only diagnostic parameters of the relevant field device are required and not of other field devices. In this way, the controller can be unloaded. For performing steps B) through ) or C) and D), a correspondingly constructed diagnostic block is preferably likewise provided in the controller, as is explained above in reference to an advantageous further development.

To the extent that only such diagnostic parameters of which a read accessing is possible directly from the controller—for example, because these diagnostic parameters are not provided device-internally, but instead in function blocks of the field device—should be read from a field device by the diagnostic system, the provision of a diagnostic block in the relevant field device can also be omitted. In this case, in the present invention, at least one diagnostic block is to be provided in the controller, wherein the diagnostic block is embodied in such a manner, that via this, the step of reading (step A)) is performed, and preferably steps B) through D) are also performed.

In an advantageous further development, in the controller, a diagnostic block is provided, via which at least one of steps A) through D) is completely or partially performed. If step A) or steps A) and B) is/are performed in the field device, it is then in each case preferable, that the remaining steps be performed via the diagnostic block in the controller. Additionally, it can be provided that all steps A) through D) are performed via the diagnostic block in the controller, wherein, in step A), in given cases, an additional diagnostic block provided in the field device is invoked, for example, in order to read device-internal, diagnostic parameters of the field device.

In an advantageous further development, the at least one diagnostic parameter is formed by one or more of the following diagnostic parameters: One or more diagnostic parameters concerning the communication of the field device, especially a stale count parameter and/or a parameter concerning the number of non-readable telegrams which are received by the field device in question, and/or one or more device-related diagnostic parameters, especially a time-out parameter, through which is given whether a response to a request is given by the field device in question within a predetermined time; a parameter via which is given whether sufficient time is available for execution of the function blocks of the field device; a parameter concerning the sensor state of the field device; and/or a parameter concerning the memory load of the field device. The flexible adapting of the diagnostic system provided by the present invention is especially advantageous in the case of these diagnostic parameters.

In an advantageous further development, a predetermined criterion for an alarm or error report is formed by a limit value for a diagnostic parameter, in the case of whose exceeding or subceeding (or falling beneath)—or, in given cases, also in the case of whose reaching—a criterion for an alarm or error report is fulfilled. If step C) yields the result that an adapting of the limit value is possible, this limit value can accordingly be increased or lowered.

In an advantageous further development, the step of checking whether a predetermined criterion for an alarm or error report is fulfilled is performed by referencing a plurality of read, diagnostic parameters of one or more field device(s). Through this further development, especially, a number of diagnostic parameters can be placed in relationship to one another. It can especially be provided that a criterion for an alarm or error report is fulfilled if a predetermined combination of certain parameter values or parameter value ranges is given. Criteria for an alarm or error report can accordingly be very detailed and specifically defined. In an additional advantageous further development, the step of checking whether an adapting of the criterion is possible is performed by referencing a plurality of read diagnostic parameters of one or more field devices. In this way, a number of diagnostic parameters, especially a number of diagnostic parameters of various field devices, can, in turn, be placed in relationship to one another. For example, an adapting can be enabled in the case of a predetermined combination of values or value ranges of parameters. In this way, it is enabled that, during the performing of step C), not only the particular information concerning the affected diagnostic parameter(s) but also information concerning additional parameters and, in given cases, additional field devices, is taken into consideration. In this way, via the diagnostic system, a detailed analysis of the specific situation can be performed, and, on the basis of a firm foundation, it can be decided whether an adapting of the criterion for an alarm or error report is possible.

In order to avoid an impermissible adapting by the diagnostic system, according to an advantageous further development, in the at least one field device, absolute limits for at least one criterion for an alarm or error report are predetermined, beyond which an adapting of the criterion is not permitted. Such absolute limits can, for example, be fixed, and, in given cases, preset, by a manufacturer of a field device.

In an advantageous further development, in the relevant field device, in which an adapting of a criterion for an alarm or error report is to be conducted, a function block is implemented (or provided), which is embodied in such a manner, that through this, a corresponding change in the field device is performed. This is especially advantageous, if the criterion to be changed in question is fixed in the field device in such a manner that an accessing thereof is not possible directly from the controller. As was explained above, this is, for example, the situation in the case of device-internal parameters. The forming of this function block itself is preferably user-specific (and especially defined by the manufacturer), and occurs in such a manner, that it fulfills the functions set forth above.

In an advantageous further development, the at least one diagnostic block is embodied as a function block, especially as a function block according to the Foundation® Fieldbus bus system (compare for this, for example: Foundation® specification, Function Block Application Process, Document FF-890, Revision EN 1.7). In this way, standardized interfaces are provided and an invoking and execution of the diagnostic block as well as the integration of the diagnostic system into a superordinated control are facilitated. The forming of the diagnostic block itself is preferably user-specific (and especially defined by the manufacturer) and occurs in such a manner, that the at least one diagnostic block fulfills one or more of the functions of the diagnostic system set forth above. The diagnostic block can, in such case, be freely programmed, for example, with the programming language IEC-1131-3.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
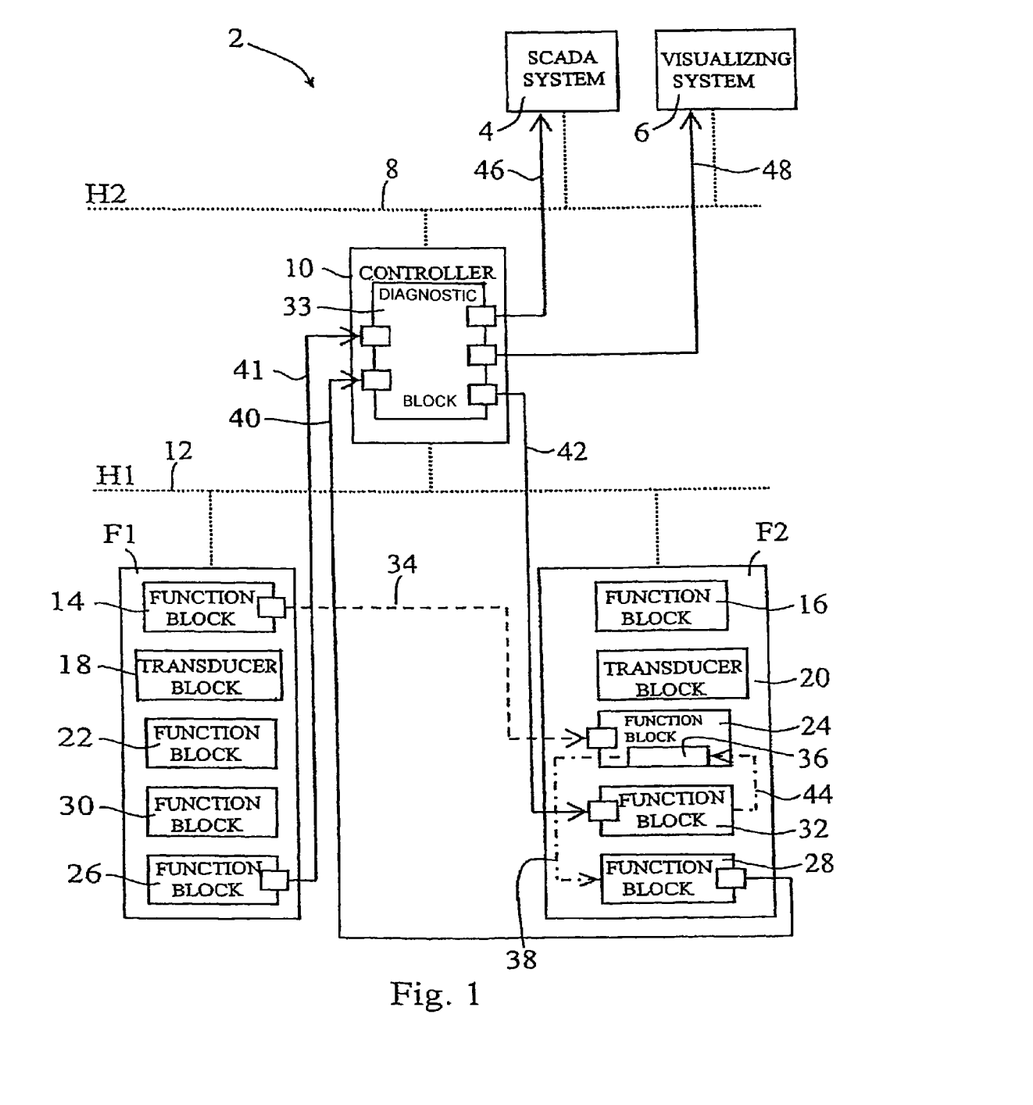
FIG.1: is a block diagram of process automation technology, for purposes of explanation of a first form of embodiment of the method of the invention.

FIG. 1 shows, for example, a plant 2 of process automation technology. In the plant 2, a SCADA system 4 and a visualizing system 6, which serves for visualizing information concerning the plant for a user, are connected to a network system 8 of level 2. The network system 8 of level 2 is formed by an HSE network, in which the H2 fieldbus technology is applied. Besides the SCADA system 4 and the visualizing system 6, other superordinated units, such as, for example, an asset management system, an archiving system, etc., can also be connected to the network system 8 of level 2.

Additionally connected to the network system 8 of level 2 is a controller 10, which forms a linking device to a Foundation® Fieldbus fieldbus system 12 of level 1. In the fieldbus system 12 of level 1, the H1 fieldbus technology is applied. Connected to the fieldbus system 12 of level 1 are a first field device F1 and a second field device F2. Along with these, still other field devices, such as, for example, sensors, actuators, or a gateway to an additional fieldbus-segment, etc. can be connected to the fieldbus system 12 of level 1.

The two field devices F1 and F2 are constructed according to the Foundation® Fieldbus fieldbus system and, in the present example of an embodiment, in each case have an AI function block (AI: Analog Input) 14, 16, a transducer block 18, 20, and an AO function block (AO: Analog Output) 22, 24. Along with these, additional or other function blocks can also be provided. Additionally, in each field device F1, F2, two additional user-specific function blocks, which, in the following, are referred to as diagnostic block 26, 28 and as therapy block 30, 32, are provided in each case. These are, as a rule, programmed by a manufacturer of the respective field device. Likewise provided in the controller 10 is a user-specific function block, which is referred to as a diagnostic block 33. The function of these user-specific function blocks 26, 28, 30, 32, 33 is explored below.

Field device F1 communicates via the fieldbus system 12 of level 1 with the field device F2 in the context of a publisher-subscriber communication, which is defined in the Foundation® Fieldbus fieldbus system. Field device F1 forms, in such case, the publisher, while field device F2 forms a subscriber. A publisher-subscriber link 34 is especially defined between the AI function block 14 of the first field device F1 and the AO function block 24 of the second field device F2, so that an output value of the AI function block 14 of the first field device F1 forms an input value of the AO function block 24 of the second field device F2. The publisher-subscriber link 34 is schematically represented in FIG. 1 by the dashed arrow 34.

Explained In the following is a possible adapting of a criterion for an alarm or error report—for example, on the basis of the parameter stale-count and its limit value—according to a first form of embodiment of the method of the invention. In the field device F2, a parameter stale-count limit is stored as a limit value for the quality of the communication of the publisher-subscriber link 34. The memory location of the stale-count limit associated with the AO function block 24 of the second field device F2 is schematically presented in FIG. 1 by the box 36. This parameter is, as a rule, predetermined during the configuring of the fieldbus system and/or by a manufacturer of the field device and remains unchanged up to this point. For monitoring the quality of this communication connection 34 (the publisher-subscriber link 34), in the second field device F2, it is checked whether the data in the input buffer memory (which is associated with the AO function block 24) of the field device F2 have changed during the last macrocycle. For this, the stale count parameter is provided in the second field device F2. If the number of sequential macrocycles within which the input value has not changed reaches the limit value (stale-count limit), a criterion for an alarm or error report is then fulfilled. Up to now, the status of the input value of the AO function block was in this case set to "bad", and the value was no longer usable.

In the case of the first form of embodiment of the method of the invention, through the diagnostic block 33 of the controller 10, the diagnostic block of the second field device F2 is invoked, in order to read the stale count parameter of the publisher-subscriber link 34. The diagnostic blocks 26, 28 of the two field devices F1 and F2 are unscheduled, which means that these are not cyclically executed, but instead only on request. The invoking the diagnostic blocks 26, 28 of the two field devices F1, F2 occurs acyclically; in the present example of an embodiment, in the context of a client-server communication (specified in the Foundation® Fieldbus bus system). The diagnostic block 28 of the second field device F2 in turn accesses the associated space in the memory for the stale count parameter. This is presented schematically in FIG. 1 by the dot-dashed arrow 38. The diagnostic block 28 of the second field device F2 then makes the stale count parameter available to the diagnostic block 33 of the controller 10, which in FIG. 1 is schematically presented by the arrow 40. In a similar manner, a diagnostic parameter from the first field device F1 can also be read, as is schematically presented in FIG. 1 by the arrow 41 between the diagnostic block 26 of the first field device F1 and the diagnostic block 33 of the controller 10.

After the reading of the stale count parameter, it is checked in the diagnostic block 33 of the controller 10 whether a stale-count limit, which is provided in the second field device F2, was reached. If this is the case, based on predetermined rules, it is checked in the diagnostic block 33 of the controller 10 whether an adapting of the stale-count limit is possible in such a manner, that this is no longer reached in the case of the adapted (or changed) stale-count limit. For example, in the controller 10, rules or algorithms can be stored, which specify that from a certain period of use of the fieldbus system 12 of level 1 on, an increasing of the stale-count limit by a predetermined amount is allowable. On the basis of these considerations, through such predetermined rules, still acceptable aging phenomena of the respective communication connection, especially of the installed cable, can be taken into consideration. Additionally, it can be taken into consideration that the field device in question is not integrated into any time-critical processes, and accordingly, a higher limit value is also allowable.

The diagnostic block 33 in the controller 10 has a decision-making function. If the diagnostic block 33 of the controller 10 comes to the conclusion that an increasing of the stale-count limit in the field device F2 by a predetermined amount is possible in such a manner that the read stale count parameter of the changed stale-count limit is no longer reached, it then outputs a corresponding command to a therapy block 32 of the second field device F2. This is schematically presented in FIG. 1 by the arrow 42. The therapy block 32 is embodied in such a manner, that, in the case of obtaining the command, it can access the place in the memory of the stale-count limit in the second field device F2, and can change this according to the command. This is schematically presented in FIG. 1 by the dot-dashed arrow 44. Additionally, via the network system 8 of level 2, a report that that the stale-count limit was adapted is sent by the diagnostic block 33 of the controller 10 to the SCADA system 4 and the visualizing system 6. This is schematically presented in FIG. 1 by the arrows 46, 48. In such case, this report can be dispatched with low priority, so that reports with high priority are not unnecessarily delayed. Through such a report, a user can, for example, be informed that a degrading of the communication connection, and especially of the publisher-subscriber link 34, has indeed occurred, but that further operation of the plant 2 is, however, still possible.

If the diagnostic block 33 of the controller 10 comes to the conclusion that an increasing of the stale-count limit is not possible in such a manner that the read stale count parameter no longer reaches the changed stale-count limit, it then outputs via the network system 8 of level 2 an alarm or error report to the SCADA system 4 and the visualizing system 6 (compare arrows 46, 48). Such an alarm or error report is, in such case, dispatched with high priority.

Figure 2:
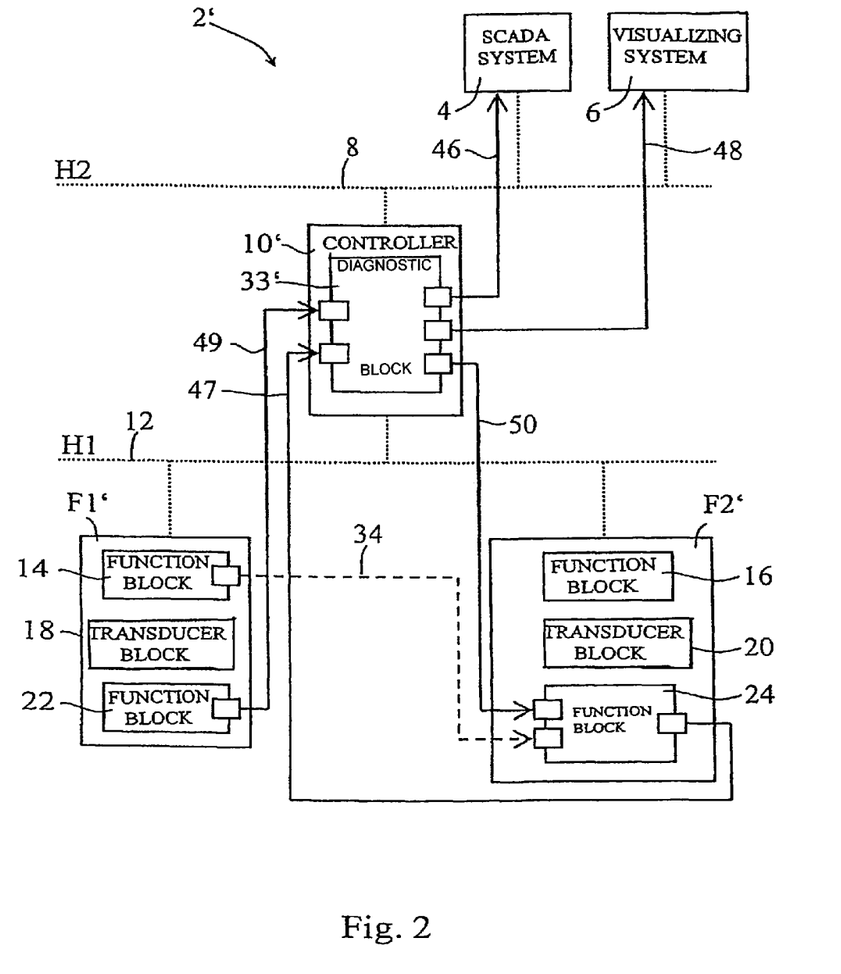
FIG.2: is a block diagram of process automation technology, for purposes of explanation of a second form of embodiment of the method of the invention.

In the following, a second form of embodiment of the method of the invention will now be explained with reference to FIG. 2. For equal components and communication procedures, the same reference numbers are again used. Primarily explored in the following are the differences with respect to the first form of embodiment.

In the case of the second form of embodiment, in contrast to the first form of embodiment, via the diagnostic system, which is employed in a plant 2' of process automation technology, only those diagnostic parameters are made use of, which the controller 10' can access directly via the fieldbus system 12 of level 1. These are, for example, parameters which are provided in the function blocks of the respective field devices F1' and F2'. In the two field devices F1' and F2', no diagnostic blocks and therapy blocks are provided. In order to read a diagnostic parameter, the diagnostic block 33' of the controller 10' directly makes a read request to the field device in question. In the present example of an embodiment, via the diagnostic block 33' of the controller 10', a diagnostic parameter provided in the AO function block 24 of the second field device F2' is read. This is schematically presented in FIG. 2 by the arrow 47. In a similar manner, a diagnostic parameter of the first field device F1' can also be read. This is schematically presented in FIG. 2 by the arrow 49 between the AO function block 22 of the first field device F1' and the diagnostic block 33' of the controller 10'.

The steps of checking in the diagnostic block 33' of the controller 10' and, in given cases, of transmitting a report or an alarm or error report to the SCADA system 4 and the visualizing system 6 occur in the same manner as was explained in the case of the first form of embodiment with reference to FIG. 1. If an adapting of a criterion for an alarm or error report with regard to the read parameter is required, and especially if a limit value provided for this is to be increased or to be lowered, this can be performed via a direct write accessing of the second field device F2' by the controller 10'. This is schematically presented in FIG. 2 by the arrow between the diagnostic block 33' of the controller 10' and the AO function block 24 of the second field device F2'.

The present invention is not limited to the examples of embodiments illustrated in the figures. As was already explained above, the method of the invention can also be applied to other diagnostic parameters. A further possible example is a diagnostic parameter concerning the sensor state of a field device. Such a diagnostic parameter can, for example, be formed by a parameter, by which the number of overload situations occurring is registered. For example, pressure measuring devices are designed for a predetermined pressure range, e.g. 0-1000 mbar. An overload situation is present if this pressure range is significantly exceeded, for example, in the case of a pressure of more than 1050 mbar. Additionally provided in the field device is a limit value for the number of overload situations occuring. In such case, the method of the invention can, for example, be implemented in such a manner, that, in the case of a first number of registered overload situations (for example, in the case of 50 overload situations), the measured value registered by the relevant pressure measuring device continues to have the status "good"; however, the controller transmits a corresponding report via the network system of level 2 to the user, or to a visualizing system, SCADA system, etc. Additionally, in the case of a second number of registered overload situations, which is higher than the first number (for example, in the case of 100 overload situations) the status of the measured value registered by the pressure measuring device is set to "uncertain". Again, the controller can transmit a corresponding report via the network system of level 2 to the user, or to a visualizing system, SCADA system, etc. In the case of a third number of registered overload situations, which is higher than the second number (for example, in the case of 150 overload situations) the status of the measured value registered by the pressure measuring device is set to "bad", so that the device is no longer usable. At the same time, an alarm or error report is sent by the controller to the user, or to a visualizing system, SCADA system, etc.

Additionally, instead of a Foundation® Fieldbus bus system, other fieldbus systems, such as, for example, a Profibus® or HART® bus system, or even a proprietary fieldbus system, can also be used.

In the forms of embodiment illustrated in the Figs., a diagnostic block is provided, in each case, in the controller. To the extent that a diagnostic block, through which various diagnostic parameters of the at least one field device are capable of being read is in each case provided in the relevant field device(s), the provision of a diagnostic block in the controller can be omitted. Steps to be performed by the controller are then to be implemented in other manner in the controller.

The diagnostic blocks and, in given cases, the therapy blocks, can be provided in the respective field devices both as instantiatable, as well as also preinstantiated blocks. In the case of an embodiment as instantiatable blocks, initially only a type of template of these blocks is present in the respective field device. Only through the instantiation of such is real memory location created in the relevant field device, so that the blocks are then actually invokable and can be executed. An instantiation can occur, for example, via the controller. After executing the respective blocks, these can also then be deinstantiated for reducing memory requirement. Alternatively, the blocks can also remain permanently instantiated. In the case of preinstantiated blocks, these are invokable from the beginning, and can directly be executed during an invoking. In this case, a corresponding memory capacity for these blocks is provided from the beginning.

The method of the invention can be initiated based on system states (for example, as a function of the duration of operation of a plant, etc.), can be initiated by a user, or can also be performed cyclically.

The invention claimed is:

1. A method for dynamically adapting a diagnostic system, which is at least partially implemented in a controller, and which has at least one diagnostic block, wherein the controller is in communication via a fieldbus with at least one field device; wherein the at least one diagnostic block is embodied in such a manner that different diagnostic parameters of the at least one field device are capable of being read; and wherein the at least one diagnostic block is implemented in the controller and/or in the at least one field device; the method comprising the steps of:
   reading at least one diagnostic parameter of the at least one field device by the diagnostic system;
   checking by the diagnostic system, referencing the at least one read diagnostic parameter, whether a predetermined criterion for an alarm or error report is fulfilled;
   if such a predetermined criterion is fulfilled, performing automated checking by the diagnostic system on basis of predetermined rules of whether an adapting of the criterion is possible in such a manner that the adapted criterion for an alarm or error report is no longer fulfilled; and
   outputting an alarm or error report only if such an adapting of the criterion is not possible.

2. The method as claimed in claim 1, wherein:
   if said step of performing automated checking yields the result that such an adapting of the criterion is possible, the criterion is automatedly correspondingly adapted.

3. The method as claimed in claim 2, wherein:
   in a case in which the criterion is adapted, a corresponding report is output by the controller.

4. The method as claimed in claim 2, wherein:
   in response to an adapting of the criterion, a corresponding change in a relevant field device is performed via a function block, which is implemented in the relevant field device.

5. The method as claimed in claim 1, wherein:
   said steps of checking whether an adapting of the criterion is possible, and outputting an alarm or error report are performed by the controller.

6. The method as claimed in claim 1, wherein:
   a report that the criterion was adapted, and/or an alarm or error report is given by the controller to at least one superordinated unit.

7. The method as claimed in claim 1, wherein:
   a diagnostic block is provided in the field device, and that, during the step of reading, the at least one diagnostic parameter of the at least one field device is provided by this diagnostic block.

8. The method as claimed in claim 1, wherein:
   a diagnostic block is provided in the field device, and that the step of checking whether a predetermined criterion for an alarm or error report is fulfilled is performed by this diagnostic block.

9. The method as claimed in claim 1, wherein:
   in the controller, a diagnostic block is provided, through which at least one of the following steps is completely or partially performed:
   said step of reading the at least one diagnostic parameter;
   said step of checking whether a predetermined criterion for an alarm or error report is fulfilled;

said step of checking whether an adapting of the criterion is possible, and/or said step of outputting an alarm or error report.

10. The method as claimed in claim 1, wherein:

the at least one diagnostic parameter comprises one or more of the following diagnostic parameters:

one or more diagnostic parameters concerning communication of the at least one field device;

one or more field device-related diagnostic parameters, of the at least one field device;

a parameter as to whether sufficient time is available for the execution of function blocks of the field device;

a parameter concerning a sensor state of the field device; and/or a parameter concerning a memory usage of the field device.

11. The method as claimed in claim 1, wherein:

a predetermined criterion for an alarm or error report comprises a limit value for a diagnostic parameter exceeding or (falling beneath) a criterion for an alarm or error report is fulfilled.

12. The method as claimed in claim 1, wherein:

said step of checking whether a predetermined criterion for an alarm or error report is fulfilled is performed by referencing a plurality of read diagnostic parameters of the at least one field device.

13. The method as claimed in claim 1, wherein:

said step of checking whether an adapting of the criterion is possible is performed by referencing a plurality of read diagnostic parameters of the at least one field device.

14. The method as claimed in claim 1, wherein:

in the at least one field device, absolute limits for at least one criterion for an alarm or error report are predetermined, beyond which an adapting of the criterion is not permitted.

15. The method as claimed in claim 1, wherein:

the at least one diagnostic block is embodied as a function block.

* * * * *